United States Patent [19]

Barth

[11] 3,941,544
[45] Mar. 2, 1976

[54] APPARATUS FOR THE PREPARATION OF FOAMED THERMOPLASTIC EXTRUDED PROFILES

[75] Inventor: Hans Jochen Barth, Emmerting, Germany

[73] Assignee: Wacker-Chemie GmbH, Munich, Germany

[22] Filed: Oct. 9, 1973

[21] Appl. No.: 404,506

[30] Foreign Application Priority Data
Oct. 9, 1972  Germany............................ 2249435

[52] U.S. Cl. .............. 425/376; 264/45.9; 425/461; 425/817 C
[51] Int. Cl.².... B29D 7/02; B29D 27/00; B29F 3/06
[58] Field of Search ........... 425/204, 205, 206, 207, 425/208, 209, 197, 198, 199, 380, 466, 467, 4 C, 817 C, 376, 461, 377; 264/47, 51, 176 R, 53, 54, 45.9

[56] References Cited
UNITED STATES PATENTS

| 1,397,571 | 11/1921 | Bowen............................. 425/377 X |
|---|---|---|
| 2,886,850 | 5/1959 | Kubiliunas........................ 425/199 X |
| 3,343,214 | 9/1967 | Myers ........................ 425/817 C X |
| 3,344,473 | 10/1967 | Achterberg et al................. 425/380 |
| 3,427,371 | 2/1969 | Skinner.......................... 425/4 C X |
| 3,720,572 | 3/1973 | Soda et al........................ 264/54 X |
| 3,834,849 | 9/1974 | Supran et al.................... 425/461 X |

*Primary Examiner*—Ronald J. Shore
*Assistant Examiner*—Mark Rosenbaum
*Attorney, Agent, or Firm*—Hammond & Littell

[57] ABSTRACT

An apparatus for the production of extruded profiles of foamed thermoplasts consisting of an extruder having an extrusion screw and a form-giving extruder head having a flow channel therethrough characterized in that at least part of the length of said flow channel is divided by separating walls having a thickness of 0.2 to 3 mm arranged in the axial direction into individual channels of such a length and cross-section area whereby each individual channel has a nozzle coefficient $k$ of from 0.1 to 2 mm³; as well as the process of extrusion.

6 Claims, 7 Drawing Figures

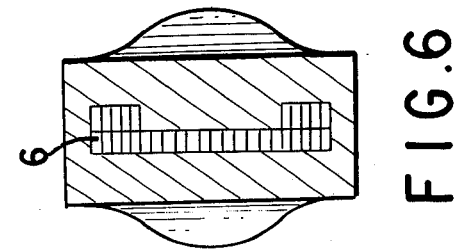
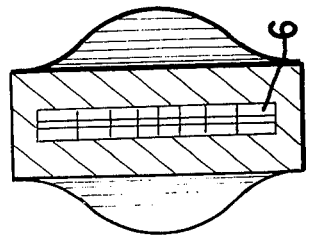
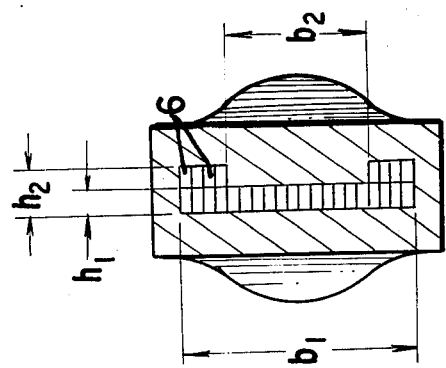
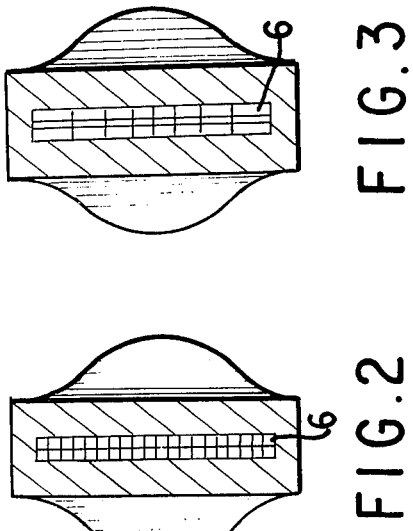
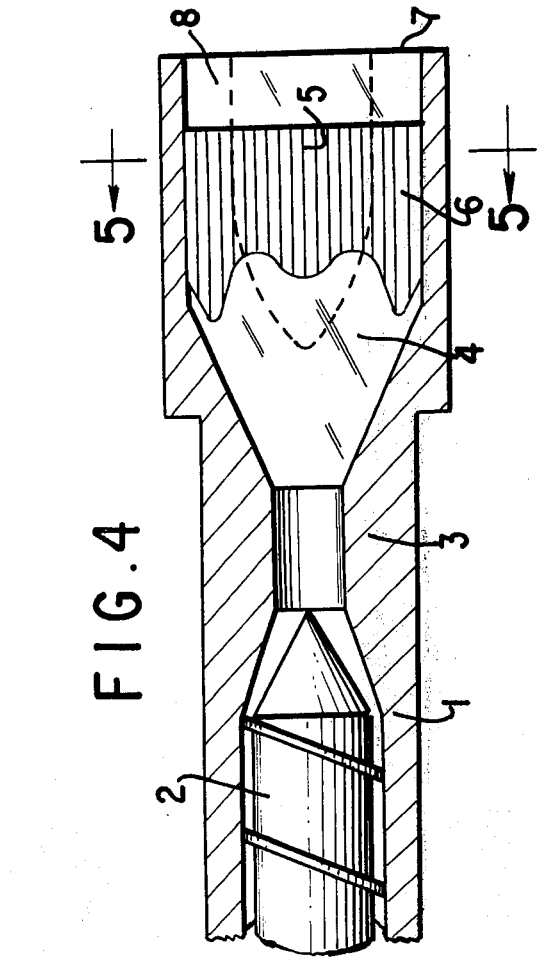
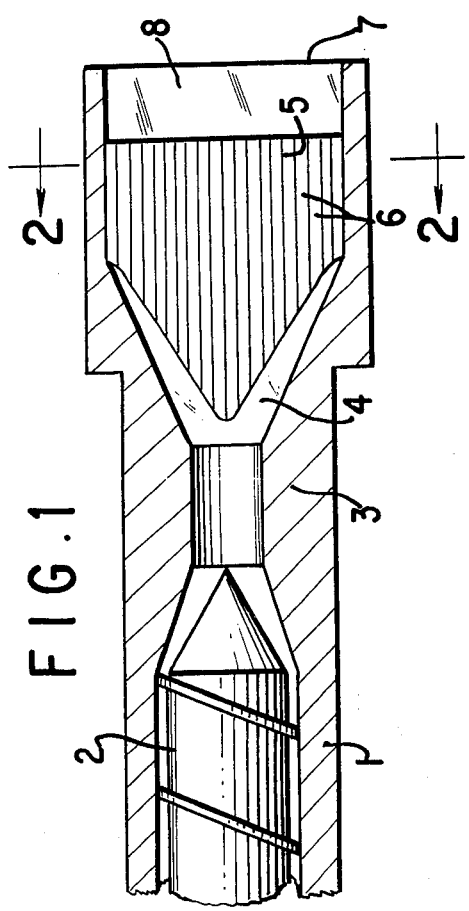

APPARATUS FOR THE PREPARATION OF FOAMED THERMOPLASTIC EXTRUDED PROFILES

THE PRIOR ART

The manufacture of profiles made of foamed thermoplasts, which contain additional stabilizers, lubricants, propellants and optionally fillers as well as further additives, by means of an extruder, is well known. The advantage of the foamed profiles resides mainly in that they require the use of about 50 weight percent less material with an equal volume. Moreover, full profiles with a large cross-section can be more readily prepared from foamed material.

Of decisive importance for the quality of the profiles and for the preparability of the profiles, in general, is the structure of the extrusion head. When extruder heads commonly employed for the manufacture of compact profiles are used, only thin-walled articles made of foamed material can be made and, in addition, the surface of these profiles is often of a rough and fissured structure.

An extruder head which has been proposed especially for the manufacture of foamed profiles comprises in the center of the head a pin which is held in place by holding means. A hollow profile is extruded by means of this head. The hollow space is foamed shut during the foaming process. The disadvantage of this head is that it permits only low expulsion rates and, in addition, a division of the stream of material into several partial streams occurs by virtue of the pin holding means, which, in the case of certain thermoplasts, will not reunite in the finished profile without leaving noticeable seams. Furthermore, this head has the disadvantage that complicated tools are necessary for the manufacture of the foamable hollow profiles.

In addition, it is known to build a perforated disk into the extrusion head, and to increase the flow resistance of the discharge nozzle thereby. After passing through the perforated disk, the individual strands are again reunited into a closed strand. However, difficulties arise in the joining of these strands and, moreover, a releasing of tension results after passage through the perforated disk by virtue of the great increase in cross-section resistance, which leads to a premature foaming of the individual strands and, in addition, often leads to deposits which, in turn, produce scorching of the material.

It was further attempted to achieve an improvement by insertion of a screen in front of the perforated disk. However, it has been shown that many pores of the foam are destroyed thereby. By virtue of the loss in gas caused thereby, foamed bodies with higher densities result. All of these known inserts in the extruder heads served to increase the flow resistance through the flow channel in the extruder head. This is of particularly great importance in the extrusion of foamable thermoplasts because the material is not only under pressure produced by the extrusion helix but also under gas pressure produced by the decomposing foaming agent. If the flow resistance is too small, the strand is expelled from the nozzle too rapidly and not uniformly; that is, in the form of a non-homogeneous strand. An increase in the flow resistance by lengthening the trough zone is only possible to a limited extent, because foaming plastic masses have poor sliding properties on metal surfaces, and thus the formation of raw surfaces is promoted.

The previously known methods, namely to increase the flow resistance by means of inserts in the extrusion head, most often lead to zones of reduced tension immediately following these inserts and thus to premature foaming of the material. This effect becomes noticeable in production of rough and fissured surfaces on the finished profiles. While these difficulties can be limited by addition of increased amounts of lubricants, profiles made from mixtures with a high lubricant content often exhibit non-uniform blisters, large pores and chunks. In addition, the capability of the material strands to be reunited decreases by virtue of the high lubricant content. A suitable measure of the flow resistance of an extrusion head is the nozzle coefficient $k$ ($mm^3$). In the case of a Newtonian media it depends, in the following manner, from the through-put $G$ ($cm^3$/sec.) from the melt viscosity $\mu$ ($kp \times sec/mm^2$), and from the mass pressure $p$ ($kp/cm^2$):

$$k = G \times \mu/p$$

From the geometry of the nozzle, the nozzle coefficient can be calculated. Examples for such calculation are described in "Kunstoffextruder-Technik", Carl Hanser-Verlag, Munchen 1963.

OBJECTS OF THE INVENTION

An object of the present invention is to provide a process for the manufacture of profiles made of foamed thermoplasts and a suitable extruder, especially an extrusion head for the performance of the process, which do not exhibit the above-described disadvantages.

Another object of the present invention is the development of an apparatus for the production of extruded profiles of foamed thermoplasts consisting of an extruder having an extrusion screw and a form-giving extruder head having a flow channel therethrough characterized in that at least part of the length of said flow channel is divided by separating walls having a thickness of 0.2 to 3 mm arranged in the axial direction into individual channels of such a length and cross-section area whereby each individual channel has a nozzle coefficient $k$ of from 0.1 to 2 $mm^3$.

A yet further object of the present invention is the development of a process for the production of extruded profiles of foamed thermoplasts which consists of extruding a foamable thermoplastic mixture through a narrow orifice into a zone divided into a plurality of individual channels defined by separatory walls arranged in an axial direction with a thickness of between 0.2 and 3 mm, where each of said individual channels has a nozzle coefficient $k$ of from 0.1 to 2 $mm^3$, foaming said foamable thermoplastic mixture and recovering an extruded profile of foamed thermoplasts.

These and other objects of the invention will become more apparent as the description thereof proceeds.

THE DRAWINGS

FIG. 1 is a cross-sectional top view of the embodiment of the extruder of the invention.

FIGS. 2 and 3 are cross-sections of two arrangements of the throttle lattices of the invention for the flow channel of the extruder of FIG. 1.

FIG. 4 is a cross-sectional top view of another embodiment of the extruder of the invention.

FIGS. 5 and 6 are cross-sections of arrangements of the throttle lattices of the invention for the flow channel of the extruder of FIG. 4.

DESCRIPTION OF THE INVENTION

Figure 7:
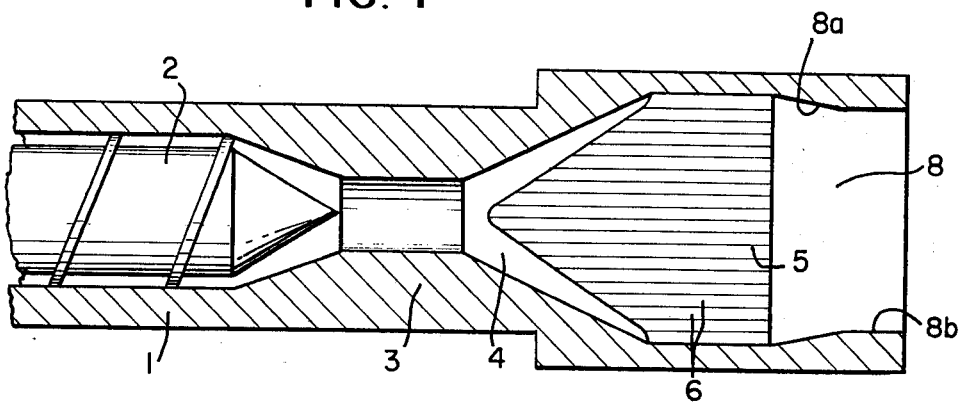
FIG. 7 shows a cross-sectional top view of another embodiment of the extruder of the invention.

The subject matter of this invention is an apparatus for the manufacture of profiles made of foamable thermoplasts by means of an extruder, characterized in that the plastic thermoplast which contains foaming agents is extruded by means of an extruder helix through an extrusion head, the flow channel of which is divided in axial direction into individual channels by means of separating walls with a thickness of 0.2 to 3 mm, where each individual channel has a nozzle coefficient $k$ or from 0.1 to 2 $mm^3$, wherein said apparatus consists of an extruder 1 with a helix 2, and an extrusion head 3, characterized in that the entire length of the flow channel 4 or a portion thereof in the extrusion head 3 is divided by separating walls 5 with a thickness of 0.2 to 3 mm arranged in axial direction into individual channels 6, where each individual channel has a nozzle coefficient $k$ of from 0.1 to 2 $mm^3$.

More particularly, the invention comprises a process for the production of extruded profiles of foamed thermoplasts which consists of extruding a foamable thermoplastic mixture through a narrow orifice into a zone divided into a plurality of individual channels defined by separatory walls arranged in an axial direction with a thickness of between 0.2 and 3 mm, where each of said individual channels has a nozzle coefficient $k$ of from 0.1 to 2 $mm^3$, foaming said foamable thermoplastic mixture and recovering an extruded profile of foamed thermoplasts; as well as an apparatus for the production of extruded profiles of foamed thermoplasts consisting of an extruder having an extrusion screw and a form-giving extruder head having a flow channel therethrough characterized in that at least part of the length of said flow channel is divided by separating walls having a thickness of 0.2 to 3 mm arranged in the axial direction into individual channels of such a length and cross-section area whereby each individual channel has a nozzle coefficient $k$ of from 0.1 to 2 $mm^3$.

By virtue of the present invention, it is possible to manufacture defect-free foamed profiles with even large cross-sections. The disadvantages of foamed extrusions known from the art are thereby avoided by the simple means of the throttle lattice.

Of decisive importance for the function of the process of the apparatus are the separating walls built into the extrusion head whereby the flow resistance in the extrusion head is influenced thereby. These separating walls are advantageously arranged in the form of a lattice, and may extend over the entire cross-section of the length of the nozzle as well as only a portion thereof. The purpose of the separating walls is to achieve as uniform a flow of the plastic mass as possible over the entire cross-section of the profile. This goal can only be achieved if each individual channel which is formed by the separating walls has a nozzle coefficient $k$ of between 0.1 to 2 $mm^3$. For the calculation of this coefficient $k$ the following formulas are valid.

Channel with Circular Cross-Section $$k = \frac{\pi \cdot F_Q \cdot r^3}{4 \cdot F}$$

Channel with Rectangular Cross-Section $$k = \frac{F_Q \cdot b \cdot s^2}{F \cdot 6}$$

where $k$ = nozzle coefficient in $mm^3$.
$F_Q$ = cross-section area of the total profile in $mm^2$.
$r$ = radius of circular cross-section in mm.
$F$ = total surface, touched by material stream within the nozzle channel in $mm^2$. (Nozzle wall and separating walls).
$b$ = channel width in rectangular cross-section in mm.
$s$ = channel height in rectangular cross-section in mm.

For practical purposes, the formulas show that the nozzle coefficient $k$, and thus the throttling effect of the separating walls, depends on the one hand upon their length in the axial direction, and on the other hand upon the height and width of the individual channel, that is upon the distance of the separating walls from each other.

In order to achieve the desired goal of a uniform flow front of the plastic mass, the axial length of the lattice may be of different size in individual zones. For example, the lattice is constructed to be longer in the center of the nozzle in the case of customary round and rectangular profiles, in order to throttle the higher flow rate in this area. The exact design can be ascertained with little effort by shortening the separating walls, such as by filing.

In the case of more complicated profiles it is often more advantageous if the non-uniform flow of the plastic mass is made uniform by making the side ranges of the individual channels different over the cross-section of the total channel. That is, at locations of higher flow rate of the plastic mass there are many channels per unit surface, so that the total channel has here a strong throttling effect, and in the zones of lesser flow rate there are correspondingly fewer channels per unit surface, and thus a lesser throttling effect. A fine adjustment of the axial length of the channels is, in most cases, additionally of advantage.

In general, the separating wall lattice is assembled outside the nozzle from individual separating walls, and is then inserted into the nozzle of the extrusion head. For example, it is held in place either by a conical shape of the flow channel by means of the material pressure, or it is welded in place. It is of advantage if it is mounted in a readily exchangeable manner, because the throttling lattice must be adapted to the melt to be extruded or to its sliding properties along the channel walls. In some cases, it is also possible to adapt the sliding properties to the throttle lattice which is already present.

Aside from the nozzle coefficient $k$, which has a value of 0.1 to 2 $mm^3$ for the individual channels according to the present invention, the nozzle coefficient of the total channel which is of advantage as a comparison with similar nozzles, can be calculated by means of the same formulas, taking into consideration the particular corresponding channel cross-section and the channel surface which is contacted by the particular stream of mass under consideration.

In the case of channels with a throttle lattice and rectangular cross-section, the following relationship between the nozzle coefficient of the individual channel and the total channel consisting of a plurality of channels exists.

$$k_G = a^2 \cdot b \cdot k_E \text{ (mm}^3\text{)},$$

where
- $k_G$ = nozzle coefficient of the total channel with throttle lattice in mm³.
- $k_E$ = nozzle coefficient of the individual channel in mm³.
- $a$ = number of individual channels on the small side of the rectangle.
- $b$ = number of individual channels on the long side of the rectangle.

In general, the separating walls do not extend over the entire length of the extrusion nozzle in axial direction. It is of advantage if the separating walls 5 terminate already before the nozzle mouth 7 to be followed by a zone 8 whose length is from 1 to 15 times the height of the flow channel. Zone 8 (see FIG. 7) preferably consisting of two areas of which the one 8b which ends in the nozzle mouth 7 comprises parallel walls, and the other 8a in back thereof comprises conical walls with a compression of 1:1.05 to 1:1.5.

By virtue of the compression, the joining of the strands formed by the separating walls is facilitated. The joining zone may, however, also comprise continuous parallel or continuous conical walls.

The total length of the nozzle lies in the general length of 2 to 25 s (s = wall distince of the nozzle in the area of the joining zone of the nozzle). Conventional dimensions of the individual channels are, for the width and height, from 3 to 10 mm, and for the length from 30 to 250 mm.

By virtue of the fact that the separating walls are constructed very thin, no release of tension subsequent to passage through the lattice occurs, and the danger of foaming or burning of the thermoplastic melt is not present. Also, the joining of the partial strands proceeds without difficulties and without seam formation.

With the aid of the process according to the invention or the apparatus according to the invention, it is possible to achieve by simple means a uniformly flowing flow front and thus to arrive at stress-free, homogeneous profiles. This is of particular importance because with the aid of the heretofore customary methods of manufacture design, such as a variation of the intake stream cross-section, no substantial improvements could be achieved in the case of foamable material.

The examples of thermoplasts which can be foamed by means of the process of this invention are PVC and its copolymers, polystyrene, acrylonitrile-butadiene-styrene, terpolymers and polyethylene. The mixtures used therein contain the conventional composition components such as lubricants, stabilizers and foaming agents. By selection of the proper composition components the properties of the profile can be substantially influenced. An advantageous mixture consists of:

100 parts by weight of PVC 1 to 20 parts by weight of acrylonitrile-butadiene-styrene resins or methyl methacrylate-butadiene-syrene resins.
0.5 to 3 parts by weight of stabilizers
0.3 to 2.5 parts by weight of lubricants
0.1 to 1.8 parts by weight of foaming agents
0 to 10 parts by weight of fillers.

FIG. 1 is a cross-sectional top view of an extruder 1 according to the present invention. By means of the helix 2, the foamable thermoplastic mass is forced into the extrusion head 3. The lattice 5 inserted into the flow channel 4 partitions the same into individual channels 6. The structure of the lattice is such that the length of the walls is longer in the middle of the flow channel so as to throttle the inherently more rapid flow of the plastic mass in the zone. By virtue of this measure, it is achieved that the plastic mass flows uniformly through the joining zone 8 and exits at the nozzle mouth 7. FIG. 2 is a cross-section of the lattice. All of the separating walls are at the same distance from each other. In FIG. 3 a lattice is shown in which the separating walls are closer together in the central portion.

FIG. 4 shows the same extruder as in FIG. 1. The extruder head shown in this figure serves to extrude a profile with bars. By length adaptation of the throttling lattice 5, an optimum adaptation of the differential flow rates can also be achieved. FIG. 5 is a cross-section of the throttling lattice with uniformly equal distance between the separating walls. Another possibility for adaptation of the flow rate is shown in FIG. 6. Here the adaptation is achieved by varying distances between separating walls.

FIG. 7 shows the same extruder as in FIG. 1 but with a zone 8 of two areas of which the one 8b which ends in the nozzle mouth 7 comprises parallel walls, and the other 8a in back thereof comprises conical walls with a compression of 1:1.05 to 1:1.5.

The following specific embodiments illustrate the practice of the invention without being deemed limitative in any respect.

EXAMPLES

A fomable polyvinylchloride resin mixture with the components of 100 parts by weight of mass polymerized polyvinylchloride ("Vinnol" Wacker Chemie GmbH) K-value 60, 2.5 parts by weight of stabilizer, 1.0 parts by weight of lubricant, 0.3 parts by weight of azodicarbonamide and dye was extruded in an extruder with D = 60 mm helix diameter, helix length 20 D and volume compression in the helix of 1:3 through various nozzles into a board-like (rectangular) continuous strand.

EXAMPLE 1

With the aid of the above-mentioned machine and the indicated material, a profile was extruded with the following nozzle: Channel dimensions at the nozzle mouth: width B = 100 mm, height A = 10 mm, nozzle length L = 300 mm, nozzle coefficient of this nozzle was $k = 25.2$ mm³. The extrudate produced thereby contained large chunks, the surface was undulating, the material flows non-uniformly from the nozzle, and spiral shaped markings produced by the helix were still recognizable on the strand. The density of the extrudate is about 0.95 gm/cm³.

EXAMPLE 2

A throttle lattice consisting of 19 slats of sheet metal 10 mm wide, and one separating wall of sheet metal 100 mm wide, was inserted into the flow channel of the device described in Example 1. Individual square channels with the dimensions 5 × 5 mm were formed thereby. The sheet metal thickness was 0.2 mm. This was not taken into consideration in the calculations. The length of the throttle lattice device was 60 mm. An entrance zone was provided before the throttle lattice, and a joining zone with a length of 30mm and a compression of 1:1.1 was provided after the throttle lattice.

The nozzle coefficient of the individual channels was $$k_E = 0.43 \text{ mm}^3$$

The nozzle coefficient of the entire extrusion head was $$k_G = 34.7 \text{ mm}^3$$

The relationship $k_G = a^2 b\, k_E$ applies to this formula.
In this example: $a = 2$ (2 rows in the height dimension), $b = 20$ (20 rows in the width dimension).

The extrudate emerges clearly more uniform and more smoothly from the nozzle. In the center of the strand the discharge rate is somewhat greater than at the edge.

The density of the extrudate is about 0.7 gm/cm$^3$.

EXAMPLE 3

In this test a throttle lattice is used whose walls are adapted to the flow front in the central area of the nozzle, that is they were lengthened by about 10 mm and extend to the edge by the length to which the nozzle extends.

The remaining apparatus was unchanged over Example 2. The nozzle coefficient of the central individual channels is about $k = 0.37$ mm$^3$. The outer channels are left unchanged over Example 2. The nozzle coefficient of the entire extrusion head was only changed to a minor extent due to this correction. The material flow in the nozzle is more uniform after correction. The edges flow about equally as fast as the central areas. The pore structure is more uniform. The density of the extrudate is 0.65 gm/cm$^3$.

EXAMPLE 4

A profile in the form shown in FIG. 5 was extruded with the same foamable mixture and the same machine as in Example 1. The dimensions were: $h_1 = 10$ mm, $h_2 = 20$ mm, total width $b_1 = 100$ mm, width of the central range $b_2 = 60$ mm, total length of the nozzle L = 200 mm. The flow channel was provided with a throttle lattice in the manner shown in FIG. 4, the wall distance of the lattice walls was 5 mm. The length of the lattice was 65 mm on the average. In the entrance areas of the two support bars with a diameter of 20 × 20 mm and in the middle of the connection component with a height of 10 mm, the resistance was increased by lengthening the throttle lattice by 10 to 20 mm. The strand emerged uniformly from the nozzle mouth. Minor differences in the discharge rate could be removed by further corrections in the throttle lattice length. The density of the extrudate with uniform pore structure was 0.63 gm/cm$^3$.

EXAMPLE 5

15 parts by weight of acrylonitrile-butadiene-styrene terpolymer were added to the mixture used in Examples 1 to 4. The extrudate produced with the apparatus of Example 3 exhibited a particularly smooth surface, a uniform pore structure, and somewhat larger pores than a mixture without the ABS polymer. The density was 0.58 gm/cm$^3$.

The preceding specific embodiments are illustrative of the practice of the invention. It is to be understood, however, that other expedients known to those skilled in the art or disclosed herein may be employed without departing from the spirit of the invention or the scope of the appended claims.

I claim:

1. An apparatus for the production of extruded profiles of foamed thermoplasts consisting of an extruder having an extrusion screw and a form-giving extruder head having a flow channel therethrough characterized in that at least part of the length of said flow channel is divided by separating walls having a thickness of 0.2 to 3 mm arranged in the axial direction into individual channels of such a length and cross-section area that each individual channel has a nozzle coefficient $k$ of from 0.1 to 2 mm$^3$, said separating walls reducing the cross-section area of said flow channel by a minor amount only.

2. The apparatus of claim 1 wherein said separating walls define individual channels with a rectangular cross-section.

3. The apparatus of claim 2 wherein said separating walls define individual channels having varied lengths in the axial direction.

4. The apparatus of claim 1 wherein said individual channels have dimensions of from 3 to 10 mm for width and height and from 30 to 250 mm for length in the axial direction.

5. The apparatus of claim 1 wherein said separating walls defining said individual channels terminate from 1 to 15 times the height of said flow channel, from the mouth of said flow channel.

6. The apparatus of claim 5 wherein the zone between the termination of said separating walls and said mouth of said flow channel consists of two areas, a first area terminating with said mouth having parallel walls and a second area extending to the rear having conical walls with a compression of 1:1.05 to 1:1.5.

* * * * *